United States Patent
Wyse

[11] Patent Number: 5,932,803
[45] Date of Patent: Aug. 3, 1999

[54] COUNTERBALANCED TRIAXIAL MULTISENSOR WITH RESONANT ACCELEROMETERS

[75] Inventor: Stanley F. Wyse, Encino, Calif.

[73] Assignee: Litton Systems, Inc., Woodland Hills, Calif.

[21] Appl. No.: 08/904,923

[22] Filed: Aug. 1, 1997

[51] Int. Cl.⁶ ..................................................... G01P 9/04
[52] U.S. Cl. ..................................... 73/504.04; 73/504.12; 73/510
[58] Field of Search .................................. 73/510, 504.04, 73/504.12, 504.02, 504.03

[56] References Cited

U.S. PATENT DOCUMENTS

| 4,795,258 | 1/1989 | Martin | 356/350 |
|---|---|---|---|
| 4,821,572 | 4/1989 | Hulsing, II | 73/510 |
| 4,841,773 | 6/1989 | Stewart | 73/510 |
| 4,996,877 | 3/1991 | Stewart et al. | 73/510 |
| 5,007,289 | 4/1991 | Stewart et al. | 73/510 |
| 5,065,627 | 11/1991 | Stewart et al. | 73/505 |
| 5,142,485 | 8/1992 | Rosenberg et al. | 73/510 |
| 5,428,995 | 7/1995 | Fersht et al. | 73/505 |

*Primary Examiner*—Hezron Williams
*Assistant Examiner*—Helen C. Kwok
*Attorney, Agent, or Firm*—Elliott N. Kramsky

[57] ABSTRACT

A multisensor of the type that employs counteroscillating rotor-mounted accelerometers to measure both linear and Coriolis accelerations operates open loop to sense linear acceleration and closed loop to sense the Coriolis acceleration from angular rate inputs. Accelerometers mounted to arms of the counteroscillating rotors are designed so that the natural frequency of the proofmass with respect to the accelerometer frame closely approximates the resonant frequency $\omega_D$ of the driven rotor pair. A robust hinge design permits open loop operation for low frequency linear acceleration inputs without saturation. Low voltage closed-loop operation is made possible by the highly compliant nature of the resonant structure in responding to the much higher frequency Coriolis accelerations generated by angular rate inputs.

23 Claims, 7 Drawing Sheets

FIG. 7

COUNTERBALANCED TRIAXIAL MULTISENSOR WITH RESONANT ACCELEROMETERS

BACKGROUND

1. Field of the Invention

The present invention relates to economical inertial navigation units (IMU's) for short range, relatively low accuracy guidance applications such as munitions. More particularly, this invention pertains to a multisensor of the type that employs paired triads of accelerometers mounted upon counteroscillating platforms for directly measuring linear accelerations and for determining rotation rates from Coriolis forces with respect to a three-axis system.

2. Description of the Prior Art

IMU's measure space-dependent rotations and accelerations with respect to orthogonal space axes. Their design is beset by numerous difficulties as this requires the simultaneous measurement of six independent variables. For example, gyroscopes of the ring laser and fiber optic type require a lasing cavity dedicated to each input axis, mandating a total of three lasing cavities, an expensive undertaking, for obtaining three of the six measurements required of an IMU. (An example of a laser device for measuring rotation about three axes is shown in United States patent, property of the assignee herein, Ser. No. 4,795,258 of Martin entitled "Nonplanar Three-Axis Ring Laser Gyro With Shared Mirror Faces".) IMU's employing spinning wheel gyros must deal with such gyros' limitation to measurement of rotation with respect to two axes of measurement, necessitating the use of an additional drive mechanism for the third input axis. Again, this does not in any way account for the additional complication introduced by the remaining measurements of accelerations with respect to the axes.

Simplicity and economy are particularly significant in the design of IMU's for munitions guidance and like applications. Such uses are characterized by non-reusable payloads, limited flight durations and only moderate accuracy requirements. One economical type of system for measuring both rotation rates and linear accelerations with reference to a set of three orthogonal axes is a multisensor mechanism taught in a series of United States patents, also the property of the assignee herein (Ser. Nos. 4,996,877 entitled "Three Axis Inertial Measurement Unit With Counterbalanced Mechanical Oscillator"; 5,007,289 entitled "Three Axis Inertial Measurement Unit With Counterbalanced, Low Inertia Mechanical Oscillator"; and 5,065,627 entitled "Three Axis Inertial Measurement Unit With Counterbalanced, Low Inertia Mechanical Oscillator.") The devices disclosed in the referenced patents employ piezoelectric drive mechanisms for causing a pair of counterbalanced platforms to oscillate out-of-phase about a common axis within a housing or case. Accelerometers, housed in a vacuum to avoid the effects of gas damping, mounted to radially-directed elements of the platforms provide measures of both linear acceleration and rotation. The latter (rotation) values are derived from the (Coriolis) forces sensed by the accelerometers at the resonant frequency of the counteroscillating structure.

The accelerometers of the above-described multisensor arrangements consist of substantially-planar, compliantly-hinged paddle-like masses. For example, the multisensor of U.S. Pat. No. 4,841,773 teaches hinges of paired crossed-beam flexure blades. The accelerometer hinges are compliant structures designed for sensitivity over a wide band of frequencies to permit complete nulling without excessive torquer voltages. The nulling voltage is a measure of not only the low frequency (in the range of 0 to approximately 500 Hz) linear accelerations but also the much higher frequency (about 3 kHz) Coriolis accelerations that indicate rotation rate. Separate capture loops are required to generate and measure the torquing voltages for nulling the responses of the pendulous mass to both low frequency linear accelerations and to the Coriolis acceleration at the counteroscillation frequency.

Arrangements of the above-described type are subject to a number of shortcomings. Due to the necessarily-high compliance (and, therefore, low stiffness) of the hinges for broadband closed-loop operation, the vacuum-housed accelerometers, and, hence, the multisensor, are subject to saturation through shock and vibration forces. Such saturation occurs when the pendulous mass is angularly displaced by a transient shock to such an extent that the separation between it and one of a pair of torquer electrodes becomes sufficiently small that the resultant electrostatic force can draw the undamped mass through the remaining gap. Once stuck to the electrode, the mass cannot readily revert to a stable nullable configuration in this totally-undamped, highly destabilizing electric field, rendering the multisensor non-operational. Time-consuming and difficult resetting and recalibration procedures are then required to free the pendulous mass and bring the multisensor back on-line.

SUMMARY OF THE INVENTION

The preceding and other shortcomings of the prior art are addressed by the present invention that provides, in a first aspect, a multisensor that includes a pair of rotors. Each of such rotors includes a plurality of radially-directed rotor arms. Means are provided for driving the rotors to counteroscillate at a resonant frequency $\omega_D$. An accelerometer assembly is fixed to each of the rotor arms. Each accelerometer assembly includes an accelerometer having a substantially-planar proofmass. The proofmass is joined to a substantially-planar accelerometer frame by a hinge so that the proofmass may be angularly displaced with respect to the frame. Each of the accelerometers is arranged so that its natural frequency of vibration is substantially equal to $\omega_D$.

In a second aspect, the invention provides a multisensor that includes a pair of rotors, each having a plurality of radially-directed rotor arms. Means are provided for driving the rotors to counteroscillate at a resonant frequency $\omega_D$ with an accelerometer assembly fixed to each rotor arm.

Each of the accelerometer assemblies includes an accelerometer having a substantially-planar proofmass that is joined to a substantially-planar accelerometer frame by a hinge so that the proofmass may be angularly displaced with respect to the plane of the frame. Means are provided for generating a first signal in response to the angular displacement of the proofmass and also for generating a second signal in response to the first signal for nulling the displacement of the proofmass of predetermined frequency.

The foregoing and other features and advantages of this invention will become further apparent from the detailed description that follows. This description is accompanied by a set of drawing figures. Numerals of the drawing figures, corresponding to those of the written description, point to the various features of the invention. Like numerals refer to like features throughout both the written description and the drawing figures.

DETAILED DESCRIPTION OF THE PREFERRED EMBODIMENT

Figure 1:
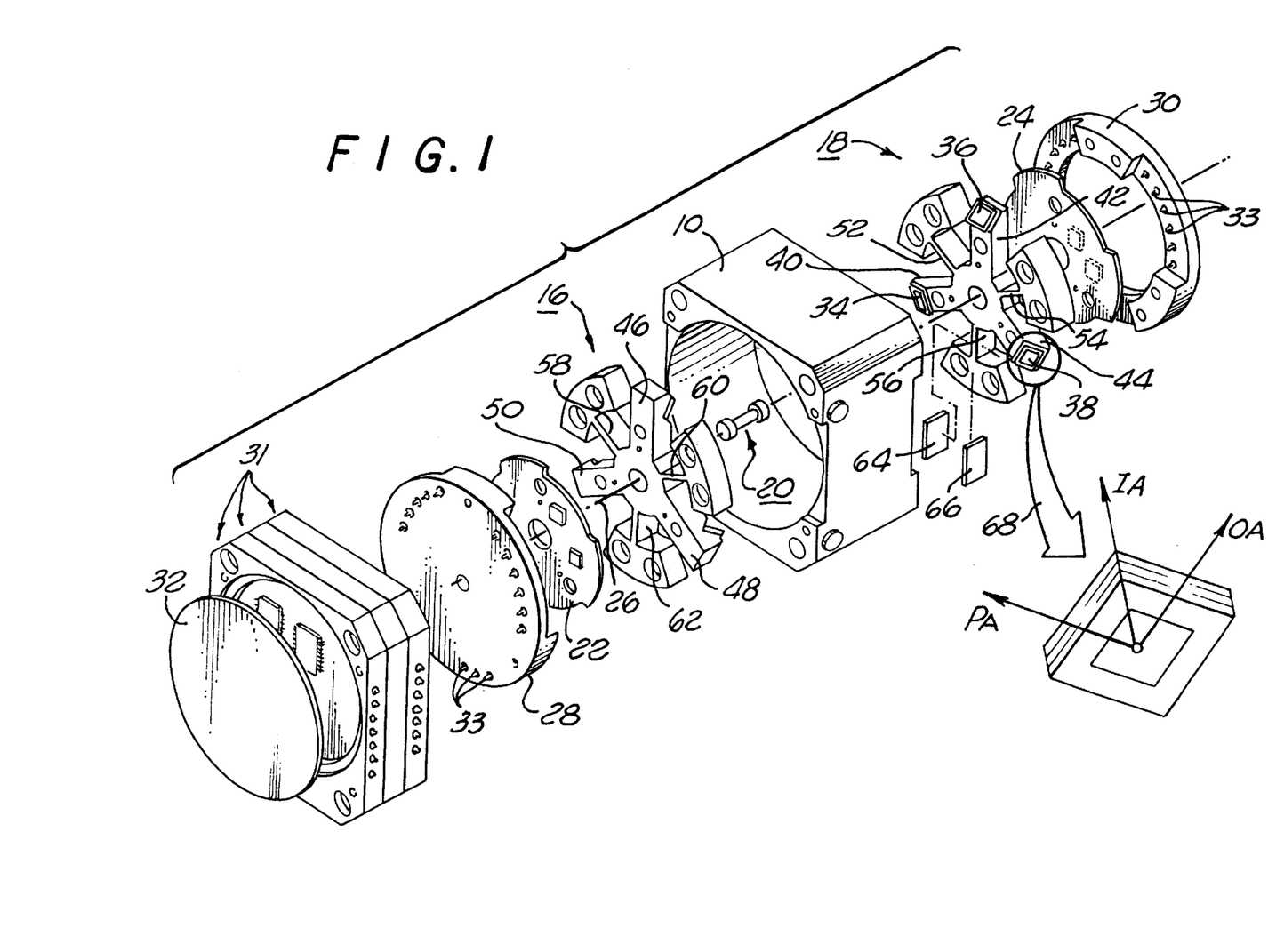
FIG. 1 is an exploded perspective view of a counterbalanced multisensor in accordance with the invention.

FIG. 1 is an exploded perspective view of a counterbalanced multisensor in accordance with the invention. The principal components and arrangements of the invention may be seen to include a multisensor casing 10 that houses various multisensor mechanisms and provides a means for mounting to a body. Active mechanisms of the multisensor include a pair of rotors 16, 18 joined at a common torsion flexure 20.

Hybrid substrates 22, 24 of circular shape are arranged concentric with the common axis of rotation 26 of the rotors 16, 18. The substrates 22, 24 include preamplifier electronics to detect or pick off the motions of the pendulous masses of accelerometers fixed to radially-directed arms of the rotors 16, 18 whereby only angular displacements of the masses in the region of $\omega_D$ are nulled. Disk-like rotor support plats 28, 30, and electronics housings 31 (each having an associated end plate 32) complete the major mechanical structures of the multisensor. Feedthroughs 33 within the peripheries of the rotor support plats 28, 30 provide communication with electronics separate from the above-described mechanical structure. Such electronics amplify outputs and generate and apply control and drive signals to the mechanical structure.

Accelerometer assemblies 34, 36 and 38 are angularly inclined adjacent the distal ends of arms 40, 42 and 44 respectively of the rotor 18. Like assemblies are fixed adjacent the distal ends of arms 46, 48 and 50 of the rotor 16. Each of the latter accelerometer assemblies is mounted at a complementary angle to that of the corresponding assembly to the rotor 18.

Radially-directed vanes 52, 54 and 56 are interspersed with the radially-directed rotor arms 40, 42 and 44 of the rotor 18 while a similar arrangement pertains to the relationship between flexure vanes 58, 60 and 62 and the rotor arms 46, 48 and 50 of the rotor 16. The rotor arms of rotor 16 are caused to oscillate 180 degrees out-of-phase with respect to the rotor arms of rotor 18 at resonant frequency $\omega_D$.

The oscillatory movements of the rotors 16 and 18 with respect to the common axis 26 result from forces applied to the vanes 52 through 62. Such forces are induced by the application of dither drive voltages to sets of vane-fixed piezoelectric bimorphs, such as the bimorphs 64, 66 located at opposed surfaces of the vane 56. Pairs of driving bimorphs are fixed to two vanes of each rotor with a pair of pickoff bimorphs fixed to the third vane. The pairs of driving piezoelectric bimorphs fixed to the opposed surfaces of rotor vanes alternately expand and contract in response to applied dither drive voltages causing the vanes to impart angular motion to the arms of the rotors 16 and 18 and, of course, to the accelerometer triads mounted thereto while voltages induced in bimorphs fixed to the flexed third vane induce a pickoff signal for use in regulating the amplitude of oscillations. The desired 180° out-of-phase oscillatory relationship between the arms of the rotors 16 and 18 may be accomplished through a number of arrangements including application of out-of-phase drive signals to the bimorphs of corresponding vanes of the opposed rotors 16 and 18 as well as affixation of oppositely-poled bimorphs to the surfaces of corresponding radial vanes of the rotors 16 and 18 while applying identical drive voltages. The generation and pickoff measurement of counteroscillatory motions of the rotor arms of the rotors 16, 18 are well-known in the art and set forth, for example, in the above-referenced United States patents.

An enlarged view of the representative accelerometer 38 fixed to the arm 44 of the rotor 18 is identified and located by means of an arrow 68. An orthogonal coordinate system is superimposed upon the accelerometer 38 to indicate its relevant axes. An axis OA is aligned with the hinge that joins the pendulous mass of the accelerometer 38 to a frame. This axis is perpendicular to an axis PA that passes through the plane of the pendulous mass while an input axis IA is perpendicular to the plane defined by the axes OA and PA. It will be seen that the alignment of the accelerometers within the counterbalanced multisensor is such that they are oscillated along the axis OA while Coriolis acceleration is measured along the axis IA. In the invention the pendulous mass of each accelerometer is deflected from a null position by low frequency linear accelerations while responses in the region of the frequency $\omega_D$ of the drive voltage are nulled. That is, in the invention, linear acceleration is measured open-loop while rotation-induced Coriolis acceleration forces are measured on a closed-loop basis.

Figure 2A:
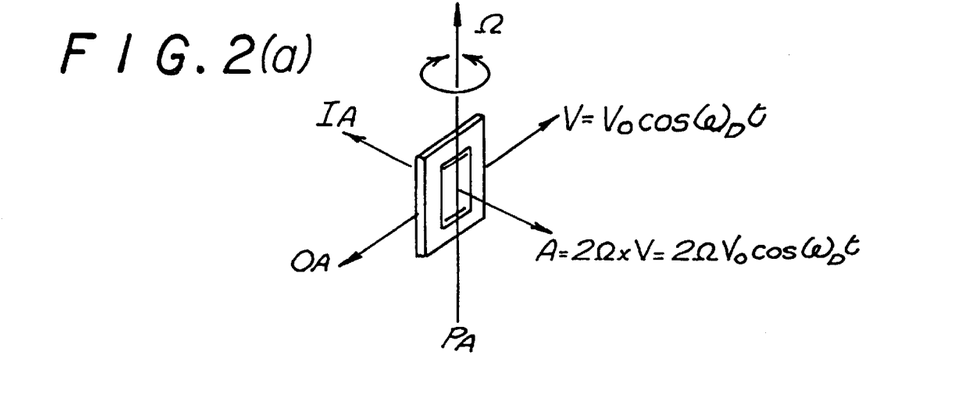
FIGS. 2(a) and 2(b) are schematic views of an accelerometer and of the counteroscillatory structure, respectively, of a counterbalanced multisensor.
Figure 2B:
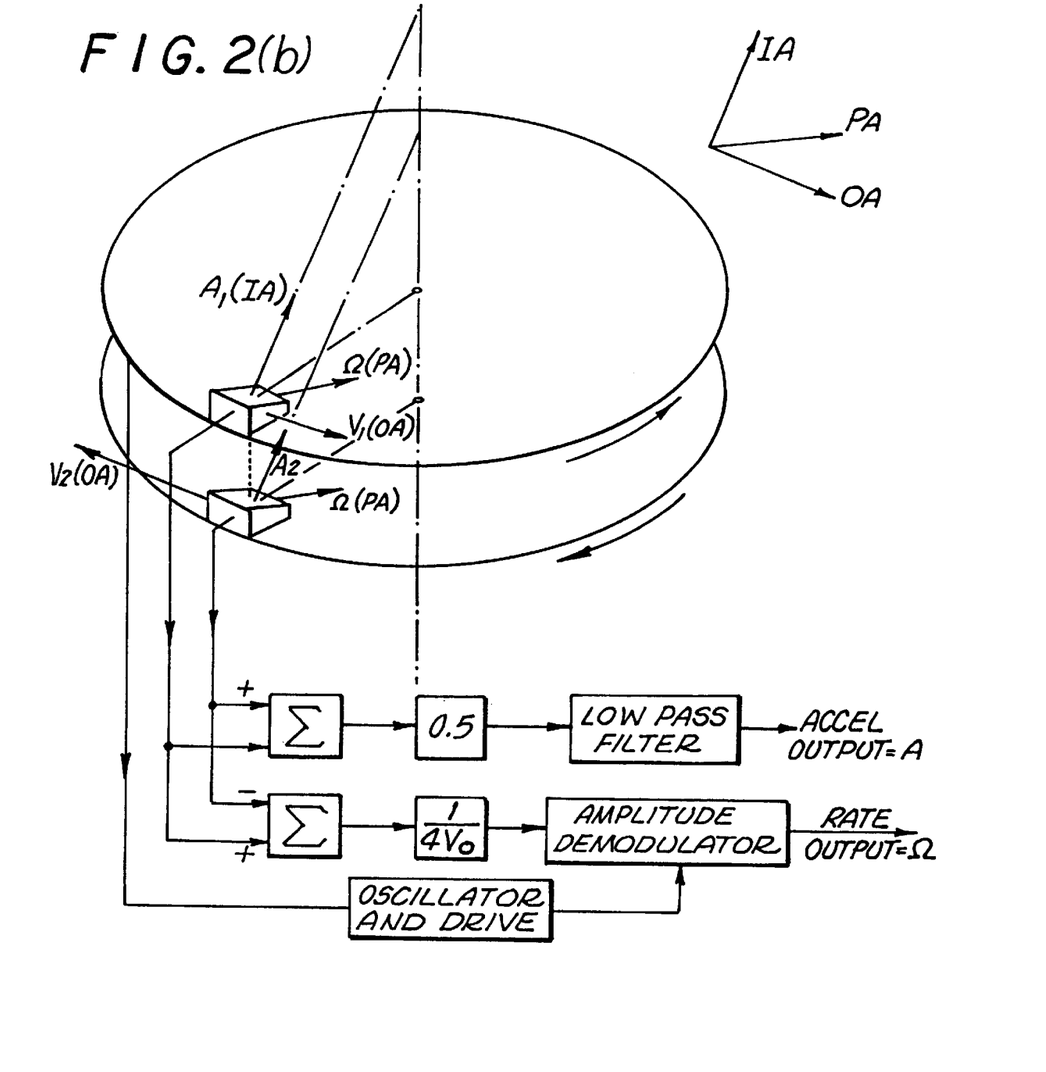

The theory of operation of a counterbalanced multisensor will be discussed with reference to FIGS. 2(a) and 2(b), each of which provides a schematic view in perspective of a central aspect of the system. In FIG. 2(a) there is illustrated a representative accelerometer with axes and vectors marked thereon indicative of a Coriolis acceleration output. FIG. 2(b) illustrates the operation of an array of accelerometers within the counterbalanced system of a multisensor.

In such a system, six micromachined silicon accelerometers permit complete measurement of the linear acceleration and angular rate of a host vehicle in body-fixed coordinates by making direct measurements of total acceleration with respect to the body axes. The total acceleration measurements are corrected for the Coriolis acceleration which is used to determine body angular rate.

Referring specifically to FIG. 2(a), Coriolis acceleration is measured as the cross product $\overline{A}_c = 2\overline{\Omega} \times \overline{V}$ where $\overline{\Omega}$ is the body angular rate vector and $\overline{V}$ is the instantaneous relative velocity of the sensor mount with respect to the host vehicle. Thus the sensor, when set in motion with a relative velocity in the direction of the output axis OA permits an angular rate about the pendulous axis PA to be observed as part of an acceleration measured along the input axis IA. The Coriolis acceleration measurement permits angular rate $\Omega$ to be observed with the accelerometers of the multisensor. However, a procedure is then required for separating the linear and Coriolis acceleration components from one another.

One approach to such separation is to induce a sinusoidal relative velocity of the form:

$$\overline{V}=\overline{V}_o \cos \omega t \tag{1}$$

The corresponding Coriolis acceleration is then:

$$\overline{A}_c = 2\overline{\Omega} \times \overline{V}_0 \cos \omega_D t \tag{2}$$

Thus, as long as an additive linear acceleration does not produce a component in the frequency band of the Coriolis part, then demodulation at $\omega_D$ of the accelerometer's output yields a measurement of angular rate about the PA axis of (each) accelerometer. Similarly, the low frequency linear acceleration component is obtained by low-pass filtering. As mentioned earlier, linear acceleration is near d.c. while the angular rate is modulated with a much higher frequency $\omega_D$.

Referring now to FIG. 2(b), the accelerometers are oriented with their input axes inclined with respect to their corresponding planes of motion to move at 180° out of phase with one another on countervibrating rotors. In the presence of an angular rate $\Omega$ along PA and an acceleration component A along IA (refer to FIG. 2(a)), the total acceleration measured by each is:

$$A_1 = A + 2\Omega V_0 \tag{3}$$

$$A_2 = A - 2\Omega V_0 \tag{4}$$

Thus, $$A = \frac{1}{2}(A_1 + A_2) \tag{5}$$

and $$\Omega = (\tfrac{1}{4} V_0)(A_1 - A_2) \tag{6}$$

A more accurate procedure for defining $\Omega(t)$ is derived from the general relations $$A_1(t) = A(t) + 2\Omega(t) V_0 \cos \omega t + e_1(t) \tag{7}$$

$$A_2(t) = A(t) - 2\Omega(t) V_0 \cos \Omega t + e_2(t) \tag{8}$$

where $e_1(t)$ and $e_2(t)$ are high-frequency vibration effects that may be considered as error terms. Upon elimination of A(t), the following results $$\Omega(t) \cos \omega t = \tfrac{1}{4} V_0 [A_1(t) - A_2(t)] - (\tfrac{1}{4} V_0)[e_1(t) - e_2(t)] \tag{9}$$

Assuming that none of the structural natural frequencies of the multisensor are close to the modulated band of $\Omega(t)$, then $e_1(t)$ and $e_2(t)$ basically cancel one another, leaving the following expression for $\Omega(t)$:

$$\Omega(t) = (\tfrac{1}{4} V_0)[A_1(t) - A_2(t)] \tag{10}$$

In the present invention, the separation and extraction of distinct values of Coriolis acceleration (and, hence, rotation rate $\Omega$) and linear acceleration relies upon a combination of accelerometer design and electronic tuning in combination with servo system configuration. The foregoing cooperate in a system in which linear acceleration is measured open-loop and Coriolis acceleration measured closed-loop. As will be seen, by employing such a scheme, numerous advantages follow including, for example, simplification of system electronics and added accelerometer reliability and durability through robustness of design.

Figure 3:
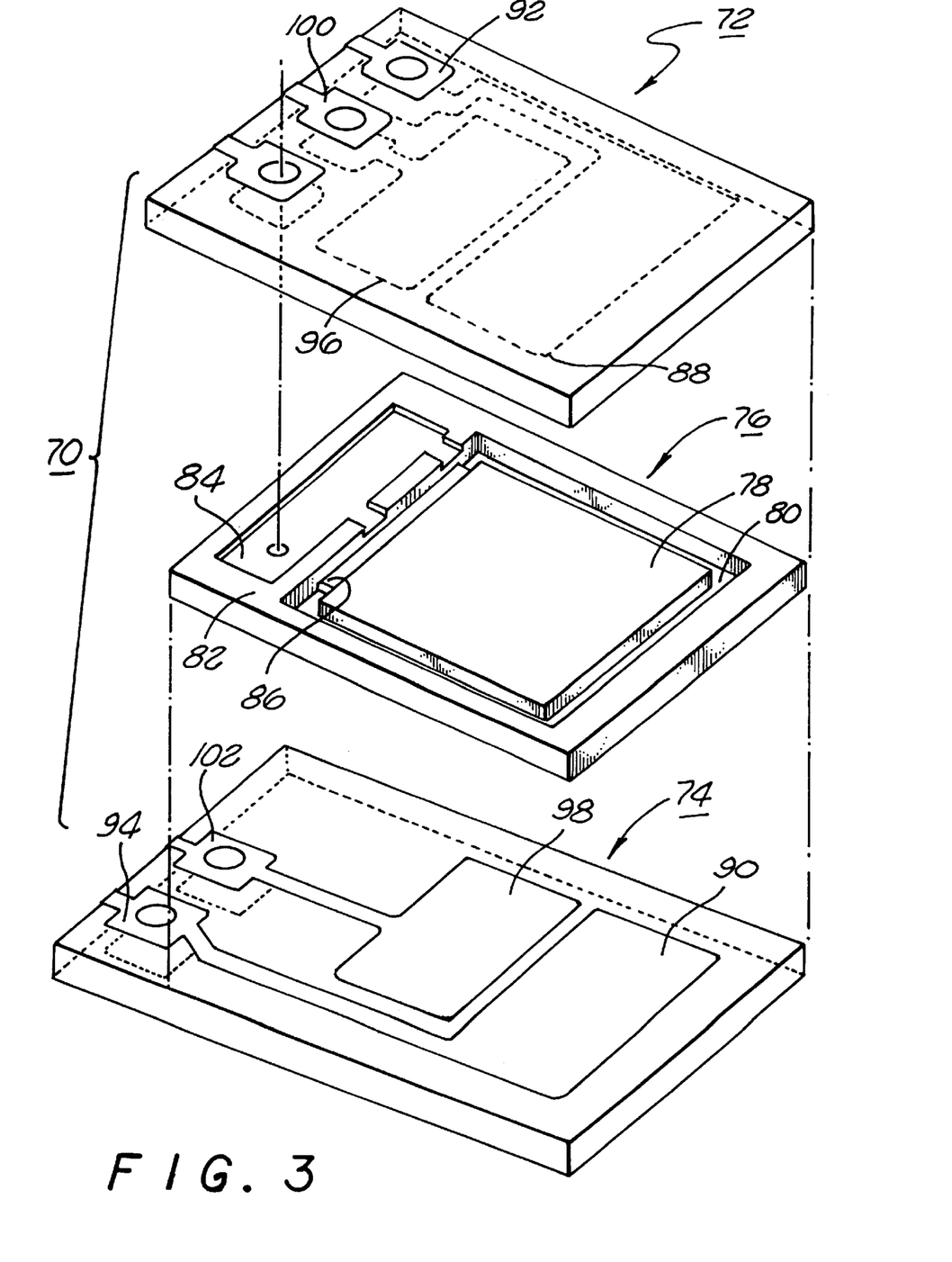
FIG. 3 is an exploded perspective view of an accelerometer assembly in accordance with the invention.

FIG. 3 is an exploded perspective view of an accelerometer assembly 70 in accordance with the invention. As seen above, the assembly 70 comprises a planar exterior appearance, being formed of an upper cover 72 of PYREX or other appropriate material (e.g. silicon), lower cover 74 of similar character and an accelerometer 76 of etched silicon sandwiched therebetween. The entire assembly 70 is formed into an integral unit by anodic bonding.

A paddle-like proofmass 78 lies within an aperture 80 formed within the accelerometer frame 82. A thinned region of the frame 82 defines a well 84 that is provided for electrical insulation from conductors associated with the upper and lower covers 72, 74. An integral hinge 86 joins the proofmass 78 to the frame 82. It is a significant feature of the present invention that the hinge 86 is significantly stiffer than the flexures of multisensor accelerometers of the prior art. For example, while a representative compliant hinge in accordance with the prior art deflects about 30 micrometers per g, the hinge 86 is designed for deflection in the range of about 0.05 micrometers per g. The spring constant of such a prior art compliant hinge is in the range of about 200 dyne-cm per radian while that of an accelerometer in accordance with the invention is approximately 130,000 dyne-cm per radian. Further, in prior art designs a gap of about three microns separates the surfaces of the nulled proofmass from each of a pair of spaced-apart plate-fixed electrodes whereas, in the present invention a more tolerant six micron clearance is provided.

The enhanced stiffness of the hinge 86 of an accelerometer 70 in accordance with the invention permits one to measure low frequency linear accelerations open-loop. That is, it is the output of the pickoff, rather than the torquer drive voltage, that measures linear accelerations. The very high stiffness of the hinge 86 assures that, even without the imposition of a nulling voltage, the proofmass 78 cannot be driven, even by extreme levels of shock and vibration, into contact with a charged electrode and to saturate the multisensor. Thus, the electronics for determining linear acceleration is simplified from that of prior art designs.

While linear acceleration is measured open loop, the accelerometer 76 is designed for resonance at $\omega_D$. As a consequence, the proofmass is compliant with respect to inputs modulated in the region of $\omega_D$. This, of course, coincides with the frequency of the Coriolis accelerations generated by input rates acting upon the counter-oscillating accelerometers.

In the invention, a torquer voltage is generated within a rate capture loop for application to torquer electrodes 88, 90. The electrodes 88, 90 constitute masked regions of about 2,000 Angstroms thickness Ti-gold vacuum-deposited onto the inwardly-facing surfaces of the covers 72 and 74 respectively. The electrodes are in contact with feedthroughs 92, 94 for providing contact with external electronics (not shown). Similarly, a combined tuning and pickoff electrode 96, 98 is likewise formed and fixed to the inwardly-facing surfaces of the upper and lower covers 72, 74 and communicates with external electronics by means of feedthroughs 100, 102 respectively. The composite structure of the accelerometer assembly 70 comprising the top cover 72, accelerometer 76 and lower cover 74 is, as mentioned earlier, anodically bonded to form an integral structure.

Figure 4:
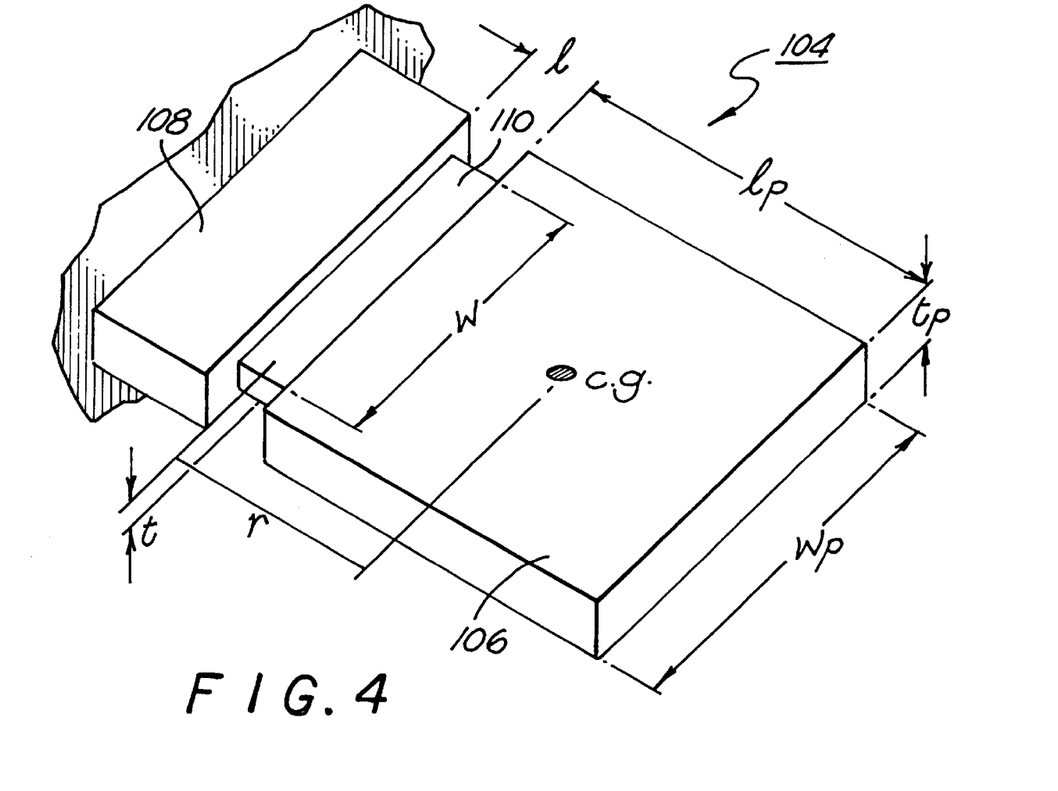
FIG. 4 is an idealized mechanical model in perspective of an accelerometer in accordance with the invention for accompanying a discussion of the design thereof.

FIG. 4 is an idealized mechanical model in perspective of an accelerometer 104 in accordance with the invention. As mentioned earlier, the accelerometer 104 is formed of single-crystal silicon that has been etched to form a proofmass 106 that is joined to an accelerometer frame 108 by means of a single continuous hinge 110 comprising a reduced-thickness area of the region between the proofmass 106 and the frame 108. The various relevant dimensions of the accelerometer 104 are indicated in FIG. 4 as follows:

t=thickness of the hinge 110
l=length of the hinge 110
w=width of the hinge 110 r = distance between the center of the hinge 110 and the center of gravity (c.g.) of the proofmass 106

$t_p$ = thickness of proofmass 106

$l_p$ = length of proofmass 106

$w_p$ = width of proofmass 106

It is well known that, for a structure in accordance with FIG. 4, the moment of inertia of the cross-section of the hinge 110 is $$I_h = wt^3/12 \tag{11}$$

The moment of inertia of the proofmass 106 about the hinge 110 is $$I = I_{cg} + mr^2 \tag{12}$$

where $I_{cg}$ is the moment of inertia of the cross section of the proofmass 106 about its center of gravity (cg) and m is the mass of the proofmass 106.

Other relationships of interest for designing an accelerometer 104 in accordance with the invention include the torsional spring rate $K_\Theta$ about the output axis OA of the hinge 110, $K_\Theta = EI_h/l$ where E is the modulus of elasticity of silicon.

The resonant frequency $\omega_r$ of the proofmass 106 about the hinge axis is $$\omega_r = (K_\Theta/I)^{1/2} \tag{13}$$

Applying the above relationships to an accelerometer in accordance with FIG. 4 having the following dimensions: 1.85 mm (r); 0.3 mm ($t_p$); 3.5 mm ($l_p$); 3.3 mm ($w_p$); and 2.4 grams/cm³ ($\rho$, density of silicon), the mass of the pendulum or proofmass of such an accelerometer is approximately 0.008 grams. Applying this value to equation 12 yields a value of $I_{cg}$ of $8.5 \times 10^{-5}$ gram-cm² which, in turn, yields a value for the moment of inertia I of the pendulum about the center of the hinge 110 (axis OA) of $3.7 \times 10^{-4}$ gram-cm².

Further assuming the following values for the dimensions of the hinge 110: 0.2 mm (l); 2.7 mm (w); and 0.0395 mm (t), equation 11 yields a value of $I_h$ of $1.38 \times 10^{-9}$ cm⁴, applying the above, the spring constant $K_\Theta$ of the hinge (assuming a modulus of elasticity E of $1.9 \times 10^{12}$ dyne/cm²) yields a spring constant of 131,100 dyne-cm/radian. From this and the value of I derived above a value of 2.996 kHz is obtained from equation 13 for the resonant frequency $\omega_r$.

From the foregoing, it is seen that the design of an accelerometer 104 having a resonant frequency that approximates that of the counteroscillating arms of the rotors 16 and 18 may be accomplished by applying a rather straightforward design to an accelerometer in accordance with the invention. The dimensions set forth in the preceding calculations approximate those of prior art accelerometers, differing mainly in regard to the stiffness of the hinge 110. Such stiffness is achieved in part by providing a single integral member as opposed to the paired and multiple hinges of the prior art accelerometers designed for high compliance over a wide band of frequencies.

Figure 5:
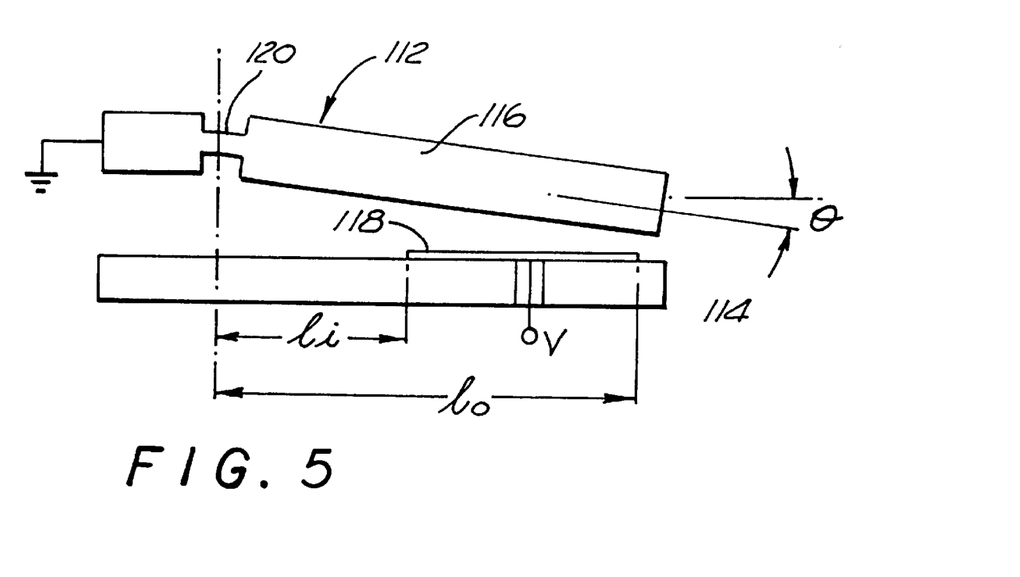
FIG. 5 is a schematic diagram of a circuit for fine tuning an accelerometer in accordance with the invention to the resonant frequency of the multisensor.

FIG. 5 is a side elevation view of an accelerometer 112 and lower cover 114 for illustrating an electrostatic method for fine tuning the resonant frequency of the accelerometer 112. As just discussed above, the design of an accelerometer in accordance with the invention having a resonant frequency that approximates that of the counteroscillating rotor supports is rather straightforward. However, the more precisely the natural frequency of an accelerometer can be tuned to the counteroscillating structure, the greater the degree of rate measurement accuracy that can be obtained.

The angular random walk, a critical performance parameter, may be reduced (and performance thereby enhanced) by a factor of the Q of the resonance.

FIG. 5 will be seen to illustrate the fact that a negative spring rate can be developed on the proofmass of the accelerometer 112 for fine tuning the accelerometer's resonant frequency to the dither frequency $\omega_D$. This follows from a recognition that the accelerometer proofmass 116 and the electrode 118 form, in combination, a capacitor. As is well known, the energy stored within such a capacitor is:

$$E = \tfrac{1}{2}CV^2 \tag{14}$$

where

C = capacitance

V = voltage across the plates of the capacitor

An angle $\theta$ defines the deviation of the proofmass 116 from null. Recognizing that deflection is a function of the torquing force T applied and that the spring rate $K_E$ of the hinge 120 is defined as the rate of change of torque with respect to deflection of the proofmass 116, $$i\ K_E = dT/d\theta = V^2/2\ (d^2C/d\theta^2) = \epsilon_o WV^2/3g_o^3\ (l_o^3 - l_i^3) \tag{15}$$

where $\epsilon_o$ = permittivity of free space ($8.85 \times 10^{-12}$ fd/m)

V = voltage between pendulum and electrode $g_o$ = pendulum to electrode gap w = width of electrode $l_o$ = length to end of electrode from the hinge center $l_i$ = length to beginning of electrode from the hinge center Typical values for a multisensor accelerometer are as follows: 1.5 mm ($l_i$); 3.4 mm ($l_o$); 5 $\mu$m ($g_o$); and 3.4 mm (w). Normalizing equation 15 for spring rate $K_E$ with respect to $V^2$ and substituting the preceding values, $K_E/V^2 = 29$ dyne-cm/rad/$V^2$ per electrode.

A spring rate $K_E$ of 131,100 dyne-cm/radian was derived earlier based upon the physical dimensions of the accelerometer. See FIG. 4 above. From the above expression for $K_E/V^2$, the application of a bias in the amount of 15 volts to electrodes configured as in FIG. 5 and fixed upon the inner surfaces of both the upper and lower covers will reduce the effective stiffness of the hinge by $2 \times 29 \times 15^2$ or 13,000 dyne-cm/radian. This represents about 10% of the positive spring rate provided by the hinge design discussed above. Since resonant frequency varies as the square root of spring rate, a decrease of up to 5% in tuned frequency may be accomplished by adjusting the biasing voltage applied to the electrodes between 0 and 15 volts.

Figure 6A:
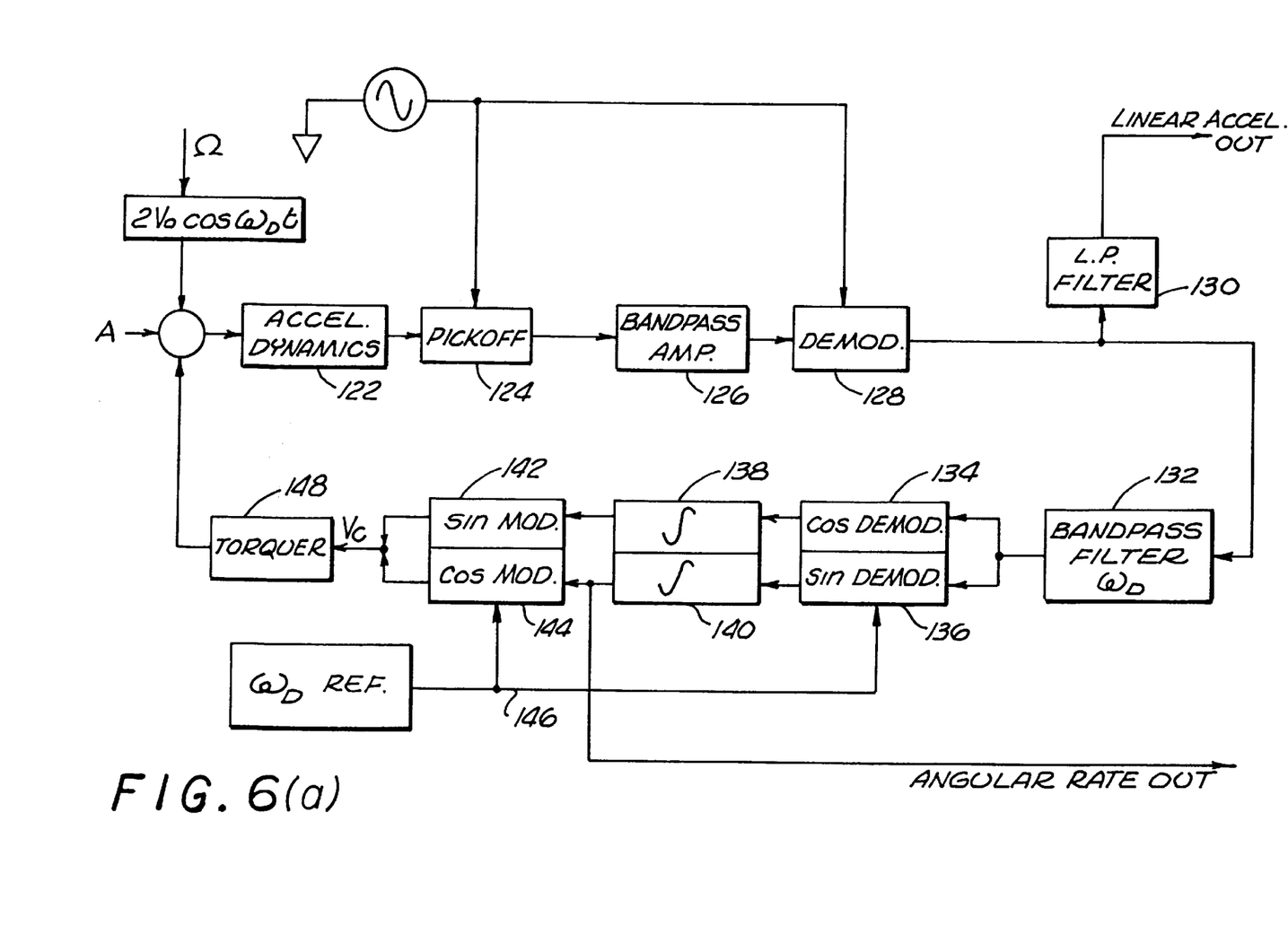
FIGS. 6(a) and 6(b) are block diagrams of alternative servo systems for controlling a multisensor in accordance with the invention.
Figure 6B:
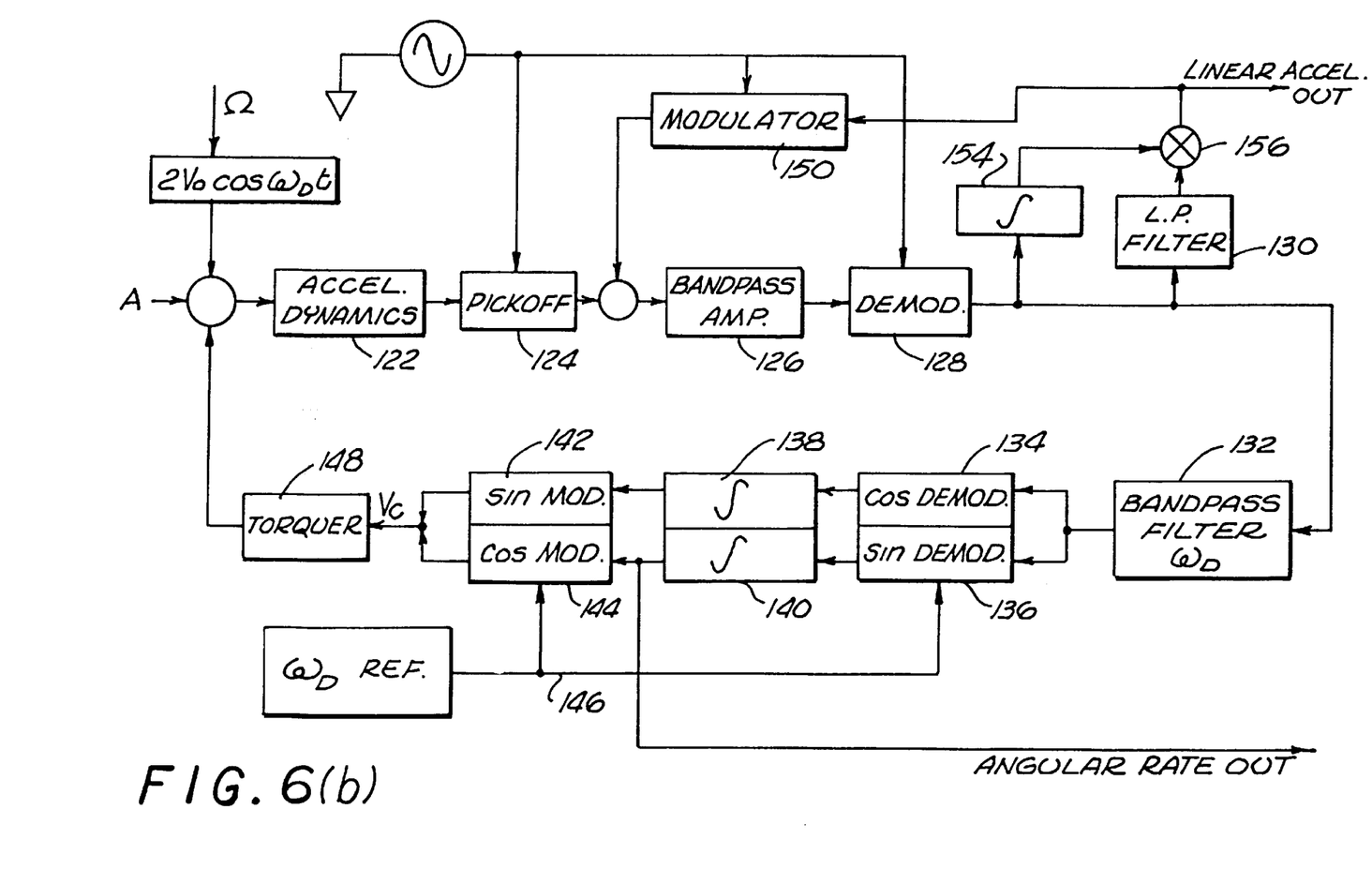

FIGS. 6(a) and 6(b) are block diagrams of alternative servo systems for controlling a multisensor in accordance with the invention. Referring first to the system of FIG. 6(a), such diagram will be understood to represent a loop for controlling a single accelerometer of the multisensor. Hence, the loop of FIG. 6(a) in effect constitutes one-half of the output of one of the three orthogonal axes measured by the multisensor.

Angular rate about the selected axis (transformed into a value of Coriolis acceleration modulated by the resonant frequency of the counteroscillating rotors by the process described with reference to FIGS. 2(a) and 2(b) above) and a low frequency linear acceleration are input to the accelerometer 122. Such inputs produce angular deflections that may include a wide range of frequency components. The transformation of the linear and Coriolis accelerations is detected by the pickoff electrodes 124 fixed to the upper and lower covers of the accelerometer assembly. A high frequency carrier (e.g. 250 kHz) modulates the pickoff output. The carrier frequency lowers the impedance of the capacitance bridge for detecting motion of the proofmass. Further, as a consequence of its high value, the carrier frequency increases the resolution of the pickoff's output for accurately measuring proofmass motion at the frequency of counteroscillation.

The output of the pickoff 124 is applied to a bandpass amplifier 126 that increases the gain of the signal to minimize the impact of the following demodulator noise. The output of the bandpass amplifier 126 is applied to a demodulator 128 and thereafter to a low pass filter 130 whose output is a measure of linear acceleration as ascertained from the degree of low frequency angular deflection of the proofmass. As mentioned earlier, in the present invention deflection of the proofmass measures linear acceleration. In contrast, it will be seen that angular rate is determined from the torquer voltage of a rate capture loop, described below.

The output of the demodulator 128 is applied to a bandpass filter 132 set to the resonant frequency of the counteroscillating rotors of the multisensor. The output of the filter 132 is applied to the in-phase (cosine) and quadrature (sine) demodulators 134, 136 that receive a dither velocity reference signal 146 at the resonant frequency $\omega_D$. (The velocity reference signal is defined as a cosine function herein with the quadrature sine signal generated by a 90 degree phase shifting circuit.) Ideally, should there be no angular rate input the outputs of the demodulators 134, 136 will be zero. Otherwise, a d.c. value will be output and applied to the integrators 138, 140. The integrators 138, 140 amplify the d.c. error signal for application to quadrature (sine) and in-phase (cosine) modulators 142, 144 which, just as the demodulators 134, 136, are driven by the dither velocity 146. The output of the modulators 142, 144, representing a correction to null the oscillations of the proofmass of frequency $\omega_D$, is then applied to torquer electrodes 148 attached to the upper and lower plates of the accelerometer assembly.

It should be noted that both the in-phase and quadrature components must be fed back to fully null proofmass oscillations at the dither frequency. Should the accelerometers not be perfectly aligned, some dither angular acceleration will be picked up. This signal will be nulled by the sine modulator 142 in quadrature with the rate signal and nulled in the rate measurement.

As mentioned earlier, angular rate is measured closed-loop. Referring to FIG. 6(a), it is noted that the output of the integrator 140, which serves as the input to the cosine modulator 144 for correcting the measured error and driving the torquer electrodes 148, provides the measure of the angular rate. Thus, from FIG. 6(a), it can be clearly seen that angular rate is measured closed loop whereas linear acceleration is measured open loop.

FIG. 6(b) is a block diagram of an alternative embodiment incorporating an optional pickoff nulling loop in association with the linear acceleration measurement. Such loop comprises a carrier modulator 150 for feeding a portion of the high frequency carrier back to the output of the pickoff 124. An integrator 154 and a low pass filter 130 receive the output of the carrier demodulator 128 and their outputs are added at a summer 156. The summed output is then applied to the modulator 150 and fed back to the summer 152 to fully null the carrier signal applied to the bandpass amplifier 126. The output of the summer 156, required to maintain nulling, provides a good measure of acceleration.

The above modification is useful insofar as there exists no force feedback loop for nulling the d.c. and low frequency displacement of the proofmass occasioned by linear acceleration inputs. Due to the absence of force feedback, the pickoff output may become quite large. Also, the position of the proofmass, even in the absence of any acceleration inputs, can become nonzero as a consequence of stray capacity mismatch in the pickoff bridge circuit or due to some remnant strain in the hinge.

The above-described circuit should be employed to avoid the presence of a large carrier voltage at the carrier bandpass amplifier 126 caused by such offset bridge output. This allows a desirable high gain in the carrier bandpass to minimize the effect of offsets and 1/f noise in the rate loop demodulation.

The incorporation of the modification shown in FIG. 6(b) automatically nulls the carrier signal for stray capacity or hinge strain so that trim resistors or capacitors do not have to be adjusted. Further, it allows for very high gain in the carrier bandpass amplifier to minimize the effect of noise following the demodulation. The carrier signal will be strong at the dither frequency processing for the rate signal but will be suppressed in the rate loop for the lower frequency linear accelerations. This signal out of the summer 156 will be a measure of linear acceleration as such signal is the value required to maintain the carrier signal at null in response to the linear acceleration input. That is, the output from summer 156 will be proportional to the linear acceleration input but the input to the dither frequency bandpass amplifier 132 will be suppressed for such lower frequency acceleration inputs.

Figure 7:
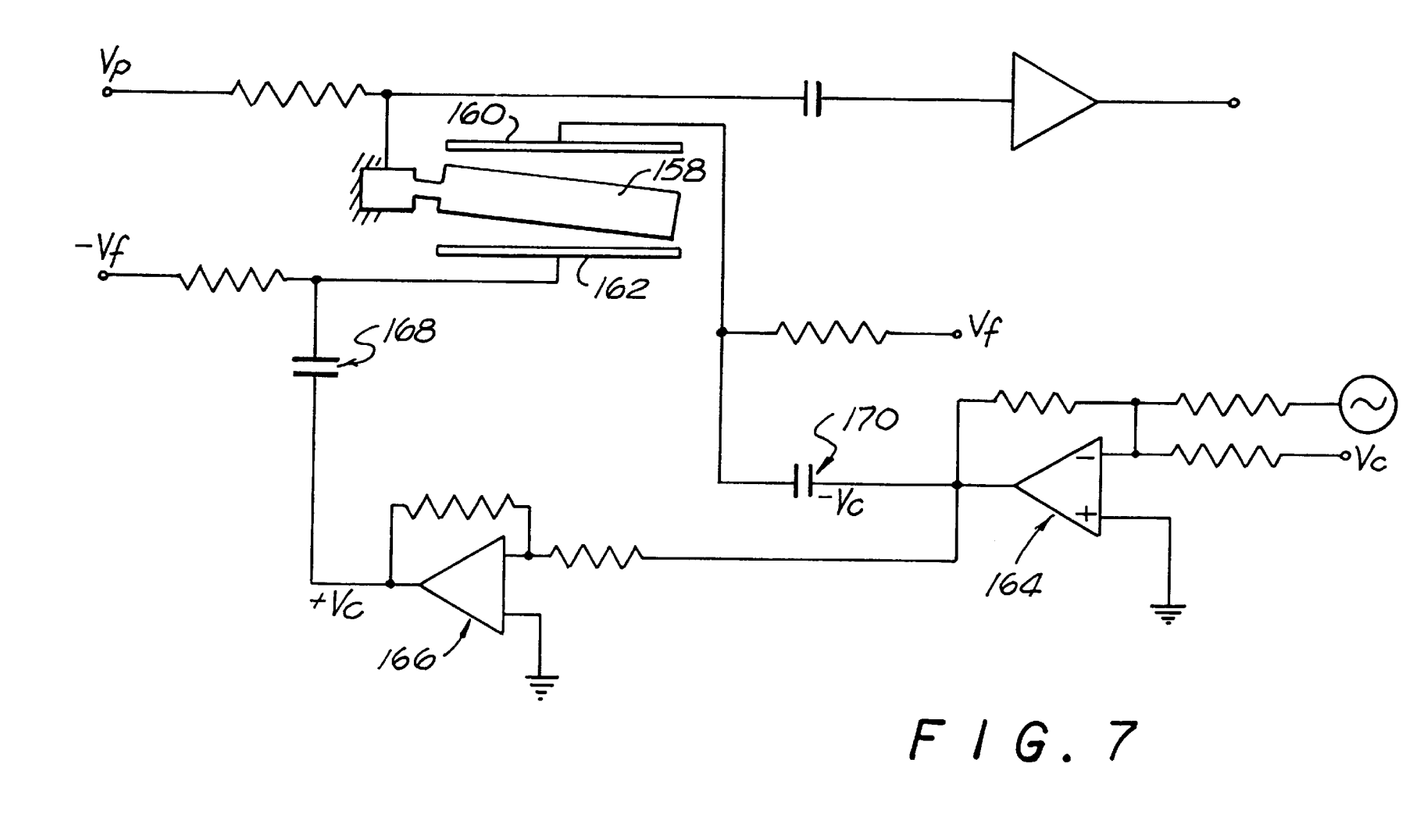
FIG. 7 is an electromechanical schematic view of the system for biasing of, and signal pickoff with, an accelerometer of a multisensor in accordance with the invention.

FIG. 7 is an electromechanical schematic view of the system for biasing and signal pickoff by means of a multisensor accelerometer in accordance with the invention. As discussed with reference to FIG. 3 above, two functions, (1) d.c. biasing to adjust the resonant frequency of the accelerometer proofmass and (2) torquing with an a.c. signal to null oscillations in the vicinity of $\omega_D$, are applied to the proofmass by common electrodes located on facing surfaces of the upper and lower covers.

Referring back to FIG. 7, the proofmass 158 is biased by a d.c. voltage $+V_p$. D.C. bias voltages of magnitudes $+V_f$ and $-V_f$ are applied to electrodes 160 and 162 fixed to the upper and lower covers respectively. The a.c. torquing voltage VC output from the sine and cosine modulators 142, 144 (see FIG. 6(a)) is applied to the electrodes 160, 162 reversed in sign through amplifiers 164 and 166 respectively. Capacitors 168, 170 isolate the various d.c. voltages from ground.

It is well-known that the torque applied to a proofmass by an electrode is proportional to the square of the voltage between the proofmass and the electrode. Assuming that equal gaps exist between the proofmass 158 and each of the electrodes 160 and 162, the net torque exerted by the electrical fields associated with the voltages $V_T$ applied to the top or upper electrode 160 and $V_B$ applied to the bottom or lower electrode 162 upon the proofmass 158 is proportional to:

$$(V_T - V_p)^2 - (V_B - V_p)^2 \qquad (16)$$

Where $V_T$ and $V_B$ represent the voltages applied to the electrodes 160 and 162 respectively. Such voltages are defined as $$V_T = (V_f - V_c) \qquad (17)$$

$$V_B = V_c - V_F \qquad (18)$$

Substituting the values above and expanding, the net torque exerted by voltages applied to the electrodes 160 and 162 is proportional to $$4V_p V_c - 4V_f V_p \qquad (19)$$

Examining the above, the torque applied through the electrodes may be characterized as a linear multiple of the torquer voltage $V_c$ (derived by the servo system) and a constant that is the product of two d.c. voltage values. The d.c. bias $V_p$ applied to the proofmass 158 sets the scale factor of the torquer voltage $V_c$. Linearity is essential to the practical combination of the torquing and d.c. spring rate biasing functions onto a single electrode. Once an appropriate scale factor has been set by $V_p$, and the fine tuning adjustment of spring rate determined through setting of $\pm V_f$, it is a relatively-straightforward matter to input an appropriate correction for the constant factor. Thus, the functions of electronic tuning of proofmass frequency and torquing for nulling Coriolis frequency vibrations may be combined onto a single electrode without affecting the torquing scale factor.

The above presents significant advantages in the manufacture of a multisensor in accordance with the invention. As separate electrodes are not required for the torquing and spring rate biasing functions, accelerometer assemblies may be manufactured more cheaply and with simplified masking processes. In additional to simplifying manufacture, the combination of torquing and spring biasing onto a single electrode allows one to form a relatively-large torquer electrode in a very limited area. This enhances both the control of natural frequency and the effective application of torquing voltage. Both of such factors, of course, contribute to enhancement of the Q of the system.

Thus it is seen that the present invention provides a multisensor of the type that includes a pair of counteroscillating rotors for mounting pluralities of accelerometers. By arranging the system whereby vibrations of the accelerometer proofmasses are nulled only at the resonant frequency of the counteroscillating rotors one may realize a very high-Q (and, consequently, very low random walk) apparatus. Such high Q is enhanced in a number of ways that amplify accelerometer response at the frequency of interest. These include design of the physical accelerometers for robustness at low frequencies (enabling open loop measurement of linear acceleration) and high compliance at $\omega_D$ for precision rate measurements. Electronic negative spring rate tuning adjustment is provided without the addition of dedicated electrodes. The robustness of the tuned accelerometers ensures that, even if shock or high vibration should drive the proofmass to contact an electrode, the high hinge stiffness will permit saturation only momentarily, with the proofmass accurately measuring acceleration and rate in a stable manner immediately after such extreme input conditions are applied.

While the invention has been described with reference to its presently preferred embodiment it is not limited thereto. Rather, this invention is limited only insofar as defined by the following set of patent claims and includes within its scope all equivalents thereof.

What is claimed is:

1. A multisensor comprising, in combination:
    a) a pair of rotors, each of said rotors comprising a plurality of radially-directed rotor arms;
    b) means for driving said rotors to counteroscillate at a resonant frequency $\omega_D$;
    c) an accelerometer assembly fixed to each of said rotor arms;
    d) each of said accelerometer assemblies including an accelerometer having a substantially-planar proofmass, said proofmass being joined to a substantially-planar accelerometer frame by a hinge so that said proofmass may be angularly displaced with respect to the plane of said frame; and
    e) each of said accelerometers being arranged so that a natural frequency of vibration of said proofmass is substantially the same as that of said resonant frequency $\omega_D$.

2. A multisensor as defined in claim 1 further including:
    a) a means for measuring deflection of said proofmass; and
    b) means for deriving linear acceleration in response to said measured deflection.

3. A multisensor as defined in claim 2 further including:
    a) means for generating a force for nulling vibrations of said proofmass of frequency $\omega_D$; and
    b) means for measuring rotation rate in response to said force.

4. A multisensor as defined in claim 3 wherein said means for deriving linear acceleration further includes:
    a) means for generating a voltage signal in response to deflection of said proofmass;
    b) an amplifier for receiving said voltage signal; and
    c) means responsive to measured linear acceleration for conditioning said voltage signal prior to application to said amplifier.

5. A multisensor as defined in claim 1 wherein said accelerometer further comprises:
    a) said accelerometer frame having an internal rectangular aperture;
    b) said proofmass being substantially rectangular and located within said aperture;
    c) said hinge joining a side of said proofmass to a side of said aperture; and
    d) said hinge being an integral member.

6. A multisensor as defined in claim 5 wherein said accelerometer further includes:
    a) said accelerometer being of silicon; and
    b) said proofmass and frame comprising an integral structure.

7. A multisensor as defined in claim 6 wherein said resonant frequency exceeds 2 kHz.

8. A multisensor as defined in claim 1 further including means for adjusting the natural frequency of said proofmass.

9. A multisensor as defined in claim 8 wherein said means for adjusting the natural frequency of said proofmass further comprises means for applying a d.c. bias voltage to said proofmass.

10. A multisensor as defined in claim 1 wherein said accelerometer assembly further includes:
    a) an upper cover and a lower cover;
    b) said upper and lower covers being fixed to opposed surfaces of said accelerometer; and
    c) at least one electrode fixed to the surfaces of each of said upper and lower covers facing said accelerometer.

11. A multisensor as defined in claim 10 wherein electrodes are arranged in at least one aligned pair fixed to said surfaces of said upper and lower covers facing said accelerometer.

12. A multisensor as defined in claim 11 further including:
    a) a first electrical circuit in electrical connection with a first electrode fixed to said upper cover and said aligned electrode fixed to said lower cover for applying equal and opposite d.c. bias voltages thereto;
    b) a second electrical circuit for sensing angular vibration of said proofmass of frequency $\omega_D$ and generating an a.c. voltage signal in response for nulling said vibration; and c) said second electrical circuit being in electrical connection with said first circuit and with said aligned electrodes for applying said a.c. voltage signal thereto.

13. A multisensor comprising, in combination:
a) a pair of rotors, each of said rotors comprising a plurality of radially-directed rotor arms;
b) means for driving said rotors to counteroscillate at a resonant frequency $\omega_D$;
c) an accelerometer assembly fixed to each of said rotor arms;
d) each of said accelerometer assemblies including an accelerometer having a substantially-planar proofmass, said proofmass being joined to a substantially-planar accelerometer frame by a hinge so that said proofmass may be angularly displaced with respect to the plane of said frame and said hinge being of sufficient stiffness so that the natural frequency of said proof mass is substantially equal to $\omega_D$;
e) means for generating a first signal in response to said angular displacement of said proofmass wherein said first signal provides a measure of linear acceleration; and
f) means for generating a second signal in response to said first signal for nulling displacements of said proofmass of frequency substantially equal to $\omega_D$.

14. A multisensor as defined in claim 13 further including:
a) means for conditioning said first signal;
b) an amplifier for receiving said conditioned signal; and
c) a low-pass filter for receiving the output of said amplifier and providing a measure of linear acceleration.

15. A multisensor as defined in claim 14 wherein said means for conditioning is responsive to said measure of linear acceleration.

16. A multisensor as defined in claim 15 wherein said accelerometer comprises an integral structure of silicon fabrication.

17. A multisensor as defined in claim 16 wherein said resonant frequency exceeds 2 kHz.

18. A multisensor as defined in claim 13 wherein said accelerometer assembly further includes:
a) an upper cover and a lower cover;
b) said upper and lower covers being fixed to opposed surfaces of said accelerometer; and
c) a plurality of electrodes being fixed to the surfaces of said upper and lower covers adjacent said accelerometer.

19. A multisensor as defined in claim 18 further including aligned electrodes fixed to said upper and lower covers in communication with said means for generating a first signal for detecting angular displacement of said proofmass and said means for generating a second signal for nulling displacements of said proofmass of said frequency.

20. A multisensor as defined in claim 2 further including:
a) said accelerometer frame having an internal rectangular aperture;
b) said proofmass being substantially rectangular and located within said aperture;
c) said hinge joining an edge of said proofmass to an edge of said aperture; and
d) said hinge being an integral member.

21. A multisensor as defined in claim 20 further including means for electronically adjusting a natural frequency of said proofmass.

22. A multisensor as defined in claim 21 wherein said means for electronically adjusting the natural frequency of said proofmass includes means for applying a predetermined d.c. bias.

23. A multisensor as defined in claim 22 further characterized in that:
a) said d.c. bias comprises d.c. voltages of equal magnitude and opposite sign; and
b) said d.c. voltages are applied to said aligned electrodes fixed to said upper and lower covers.

* * * * *